United States Patent [19]
Fletcher et al.

[11] Patent Number: 5,292,433
[45] Date of Patent: Mar. 8, 1994

[54] METHOD AND APPARATUS FOR RECOVERING OIL SPILL

[76] Inventors: Gerald L. Fletcher; Gregory T. Fletcher, both of P.O. Box 4978 JKTM, Jakarta 12049, Indonesia

[21] Appl. No.: 926,053

[22] Filed: Aug. 4, 1992

[51] Int. Cl.⁵ ............................................. L02B 15/04
[52] U.S. Cl. ................................. 210/170; 210/242.3; 210/923
[58] Field of Search ............. 210/170, 242.3, 776, 210/923

[56] References Cited

U.S. PATENT DOCUMENTS

| | | | |
|---|---|---|---|
| 3,556,301 | 1/1971 | Smith | 210/242.3 |
| 3,666,098 | 5/1972 | Garland | 210/923 |
| 3,709,366 | 1/1973 | Pruitt | 210/923 |
| 3,779,382 | 12/1973 | Steltner | 210/242.3 |
| 3,788,079 | 1/1974 | Kirk et al. | 210/923 |
| 3,853,787 | 12/1974 | Mohn | 210/242.3 |
| 4,049,554 | 9/1977 | Ayers | 210/242.3 |
| 4,070,423 | 1/1978 | Pierce | 261/77 |
| 4,146,482 | 3/1979 | Shyu | 210/242.3 |
| 4,186,095 | 6/1980 | Walin | 210/242.3 |
| 4,196,087 | 4/1980 | Gordon | 210/242.3 |
| 4,332,519 | 6/1982 | Walin | 415/52 |
| 4,449,850 | 5/1984 | Cessou | 405/60 |
| 4,610,788 | 9/1986 | Ward | 210/242.3 |
| 4,935,752 | 6/1990 | Gonzales | 210/923 |

FOREIGN PATENT DOCUMENTS 2921667 12/1980 Fed. Rep. of Germany .

*Primary Examiner*—Christopher Upton
*Attorney, Agent, or Firm*—John E. Reilly

[57] ABSTRACT

An oil spill recovery system for removal of oil spill contaminants from the surface of a body of water has a suction blanket which can be deployed by a host vessel, there being a plurality of air pressure lines through the blanket with suction ports to induce the flow of water and any oil spill in communication with the ports through the conduits into a common collection chamber, and the contaminants can then be exhausted or removed from the collection chamber as necessary and separately collected.

14 Claims, 2 Drawing Sheets

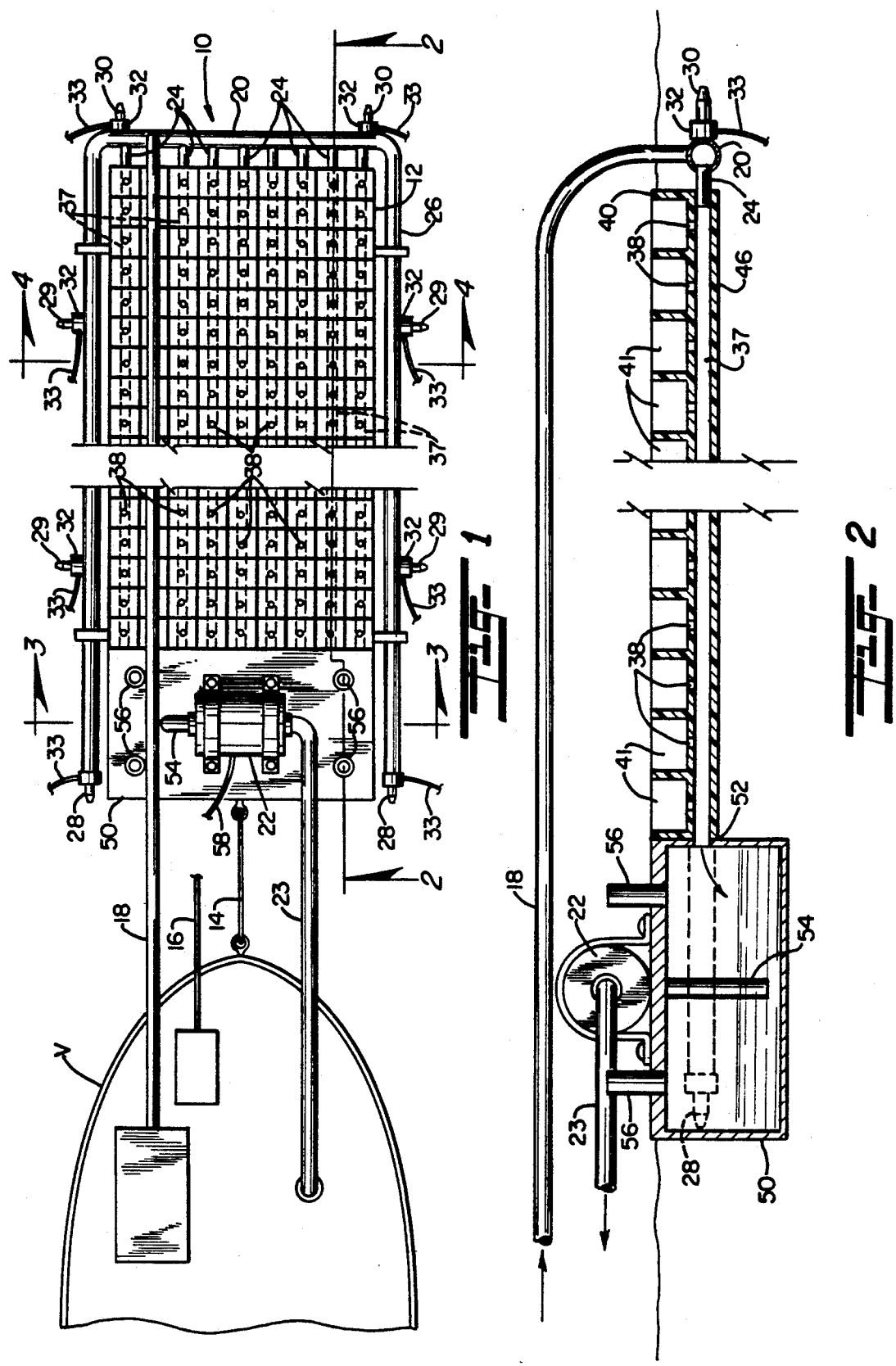

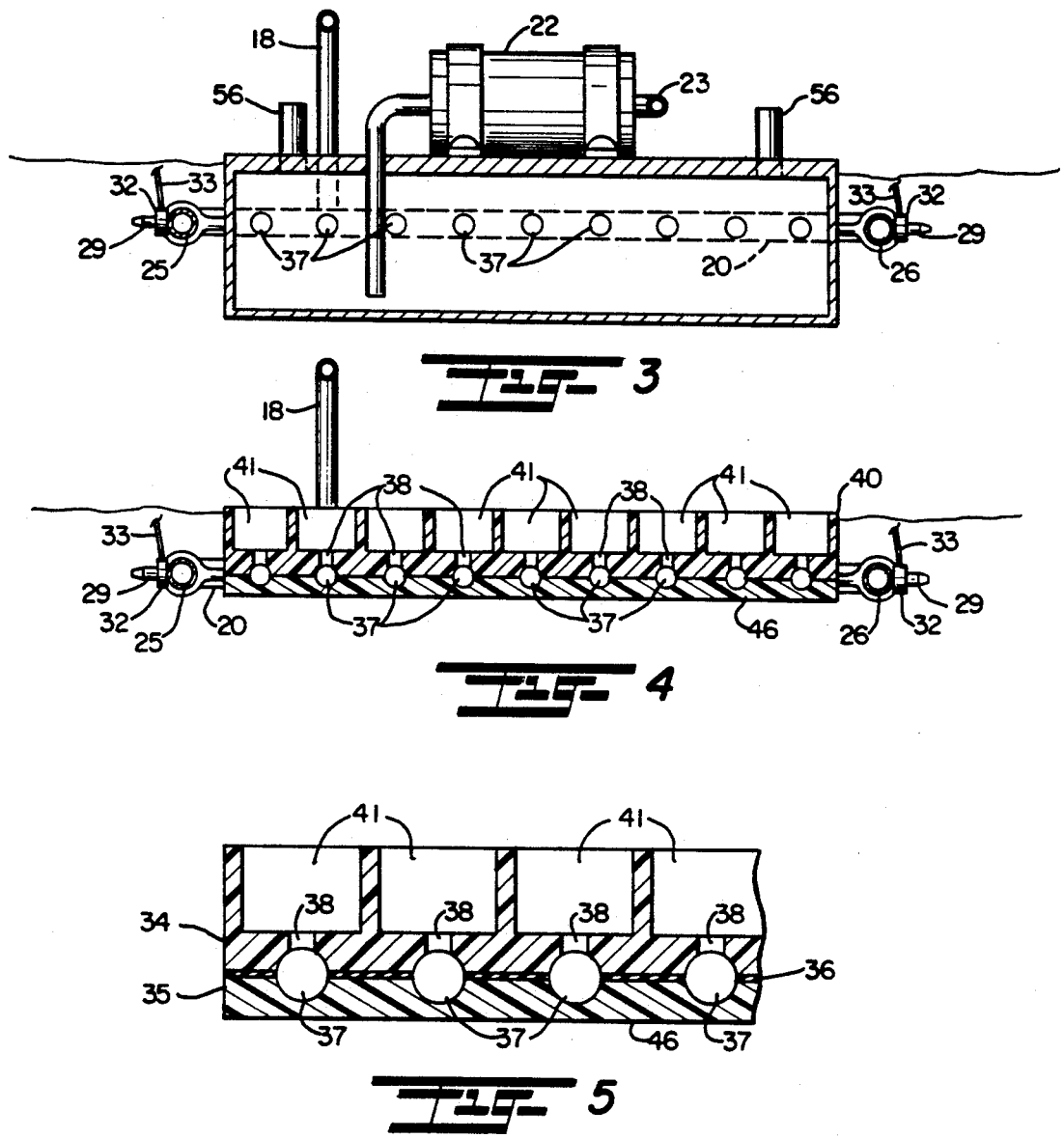

METHOD AND APPARATUS FOR RECOVERING OIL SPILL

This invention relates to a novel and improved method and apparatus for collecting contaminant materials, such as, an oil spill which has spread over the surface of a large body of water and to accomplish same in a dependable and efficient manner.

BACKGROUND AND FIELD OF THE INVENTION

Efficient recovery of oil spills has presented major problems and particularly in the ability to recover spills extending over large surface areas of a body of water. In the past, suction devices have been employed that typically will draw the oil spill off of the surface of the water through horizontal pipes or lateral suction devices. As a result, the percentage recovery of the oil spill to water itself is relatively low and therefore is time consuming to the point that the oil spill will tend to spread faster than it can be cleaned up. Conventionally, the separation equipment must be mounted on board a stable platform or onshore and the suction equipment in some manner must be towed behind a vessel. Relatively high capacity pumps and compressors are required for recovery, handling and separation of the contaminant material from the water. The recovery equipment which is towed behind the vessel further suffers from lack of efficiency when used in rough or roilly seas and can be difficult to control or steer under such conditions.

Representative of approaches which have been taken in the past is the skimming apparatus disclosed in U.S. Pat. No. 4,610,788 to J. A. Ward which comprises an open framework having floats at spaced intervals and a pumping section which communicates via a flexible conduit into a separating device. The apparatus is primarily intended for use in secondary oil recovery pits but not designed for towing and requires that the oil rich layer of the top surface of the pit be drawn over fin sections and a plate into a downspout which communicates with the pump at the center of the apparatus. U.S. Pat. No. 4,146,482 to J. Y. Shyu is also a stationary device which employs tubes extending from one end of a panel with a float and anchor at the opposite end of each tube section to make the device buoyant, and the oil is collected through a collecting tube underneath the panel into a container for separating the oil and water by gravity and permit removal of the oil to a nearby ship.

It is therefore desirable to provide for a method and apparatus for the recovery or removal of contaminants from the surface of a body of water which can be deployed from a vessel and achieve rapid and efficient recovery of contaminant materials over large water surface areas, can be steered or controlled by remote control from a vessel and when not in use can be stored in a compact condition so as to occupy relatively little space on the vessel.

SUMMARY OF THE INVENTION

It is therefore an object of the present invention to provide for a novel and improved method and means for recovering oil spills which have spread over large surface areas of a body of water.

Another object of the present invention is to provide for a novel and improved apparatus which can be deployed from any vessel to mechanically remove contaminant fluids from a water surface, the apparatus being characterized by being steered and remote controlled from the host vessel while covering large surface areas of the water and yet can be stored in a compact condition on the vessel when not in use.

It is a further object of the present invention to provide for oil spill containment apparatus incorporating one or more buoyant suction panels or blankets which can be advanced along a water surface and is capable of removing contaminant fluids from the surface of the water in a reliable and efficient manner.

An additional object of the present invention is to provide for a novel and improved oil spill recovery system which can be remote-controlled and steered from a host vessel and in use will have a dampening effect on the waves while conforming to the surface of the water and which is capable of collecting and recovering maximum ratios of contaminant fluids to water in a minimal period of time.

In accordance with the present invention, an oil spill recovery system has been devised for collecting oil spill contaminants from the surface of a body of water wherein a host vessel is provided with a source of air under pressure, the combination therewith comprising a suction blanket in the form of a flat elongated sheet member having opposed surface portions and a plurality of conduits extending through the blanket, and air suction ports at spaced intervals along the conduits for extension through one or both of the surface portions, air intake and return means cooperating with the conduits to induce by the venturi effect the flow of water and any oil spill in communication with the ports into the conduits, and means for collecting the water and the contaminants from the conduits. Preferably, the conduits extend in a lengthwise direction through the blanket and the air intake and return means are at opposite ends of the blanket. Furthermore, the blanket is composed of a flexible plastic sheet material with depressions at least along an upper surface portion, and the sheet will conform irregularities on the surface of the water, and steering means are provided for each blanket in controlling its movement through the water adjacent to the host vessel.

The above and other objects of the present invention will become more readily appreciated and understood from a consideration of the following detailed description of a preferred embodiment when taken together with the accompanying drawings wherein:

BRIEF DESCRIPTION OF THE DRAWINGS

FIG. 1 is a plan view of a preferred form of oil spill recovery system in accordance with the present invention;

FIG. 2 is a cross-sectional view taken about lines 2—2 of FIG. 1;

FIG. 3 is a cross-sectional view taken about lines 3—3 of FIG. 1;

FIG. 4 is another cross-sectional view taken about lines 4—4 of FIG. 1; and

FIG. 5 is a cross-sectional view of a modified form of suction blanket in accordance with the present invention.

DETAILED DESCRIPTION OF THE PREFERRED EMBODIMENT

Referring in more detail to the drawings, there is illustrated in FIGS. 1 to 4 a preferred form of recovery apparatus 10 which is especially adaptable for use in recovering oil spills or other contaminant fluids which have spread over large surface areas of a body of water. In its preferred form, the recovery apparatus 10 is broadly comprised of one or more suction blankets 12 which are deployed from any standard ocean vessel V and tethered to the host vessel by means of a tether cable 14. An electrical cable 16 and compressed air conduit 18 also extend from the host vessel V to provide the necessary power to each of the blankets 12 in a manner to be described and with the conduit 18 extending into a manifold 20 at one end of each blanket 12. A fluid exhaust pump 22 is disposed at the opposite or forward end of each blanket 12 and has a return conduit line 23 from the pump 22 back to the host vessel V.

Individual suction lines 24 extend forwardly from the manifold 20 at spaced intervals and in parallel relation to one another into one end of the blanket 12. In addition, steering conduits 25 and 26 extend forwardly from the manifold 20 along opposite sides of the blanket 12 and in parallel to the lines 24. Each conduit 25 and 26 includes a forward steering jet 28 extending horizontally in a forward direction at the forward end of the respective conduit, intermediate jets 29 extending normally to and outwardly from each conduit and rear steering jets 30 extending or facing in a rearward direction. Each of the jets 28–30 includes a pilot-operated solenoid 32 with electrical control lines 33 leading back to the electrical power conduit or cable 16 so that each steering jet 28–30 can be independently and remotely controlled from the host vessel V in steering and manuevering through the polluted area.

One or more of the suction blankets 12 may be interconnected in tandem so that, for example, a second suction blanket, not shown, may be connected by a tether cable to the trailing end of the first suction blanket 12. Each blanket 12 is preferably in the form of a flexible sheet or body of generally rectangular configuration and elongated in the direction of the tether. As best seen from FIGS. 2 to 4, a pair of upper and lower layers 34 and 35 composed of a high strength plastic sheet material are bonded or fused together as at 36 with openings 37 formed at spaced intervals along the interface between the layers 34 and 35 which are in alignment with and form continuations of the intake suction lines 24. Thus, the openings 37 extend lengthwise, or in the direction of the tether cable, and upright suction tubes or ports 38 extend upwardly at spaced intervals from each of the suction lines or openings 37 through the upper layer 34. The upper layer or half 34 includes an upper surface 40 which is of generally waffle-shaped configuration having a continuous series of shallow depressions or recesses 41 surrounded by upstanding ribs 42 throughout the length and breadth of each blanket 12. The ribs are arranged in the form of a a generally rectangular grid or network throughout the upper surface of the blanket so that one of the suction tubes or bores 38 extends centrally of each individual depression 40. The lower layer or half 35 of each suction blanket has a substantially flat undersurface 46 but, owing to the flexibility of the plastic sheet material of the blanket 12, will tend to conform to irregularities in the surface of the water. Moreover, there may be conditions in which it is desirable to reverse the disposition of the blankets 12 and 12' so that the waffle-shaped depressions 40 extend downwardly rather than upwardly in being manuevered across the surface of the water.

The suction lines or openings 37 communicate at their forward ends directly with a collection chamber 50 as shown in FIG. 2. Essentially, the collection chamber 50 may be formed out of a material corresponding to that of the blanket and joined as at 52 to the leading end of the blanket with the exhaust pump 22 anchored to the top surface of the chamber and having an intake line 54 extending downwardly into the collection chamber for pumping the collected materials through the exhaust or return conduit 23. In this relation, compressed air is delivered at a sufficiently high velocity through the suction lines 37 as to create a vacuum or negative pressure (venturi effect) sufficient to draw any of the fluids which accumulate within the depressions 40 through the suction ports 38 as the blanket 12 is being manuevered through the water. As a result, the collection chamber will receive a considerable amount of sea water together with contaminated materials, and the intake line 54 is preferably set at a level such that the contaminated fluids which will tend to float on the water are removed from the collection chamber 50. However, a conventional separator is provided aboard the host vessel to separate the oil from water. The compressed air will exhaust through the vents 56 in the upper surface of the collection chamber. Electrical control lines 58 extend from the power conduit 16 to the pump 22 in order to control the operation of the pump from the host vessel.

Preferably, the suction blanket is formed of a high strength, flexible plastic or plastic foam material and each of the depressions 40 may, for the purpose of illustration, be on the order of 4 cm by 4 cm by 2 cm deep. The length, width and thickness of the blanket 12 is not critical as far as its function is concerned, although it should be at least 2 to 3 meters wide in order to cover a broad surface area. Also, the thickness and flexibility of the blankets should be such that they can be easily folded or rolled into a compact condition for storage purposes when not in use.

In use, it is desirable that the blanket 12 float at or just under the surface of the water, and this buoyancy may be aided if necessary by the addition of special buoys built into the pump housing or collection chamber. The air flowing through the conduits or lines 24, 37 will further aid in maintaining buoyancy of the system and, of course, the collection chamber 50 should also be formed of a buoyant material. As it is being manuevered through the water, any surface waters containing the contaminated materials will tend to wash over the blanket surface and be collected in the depressions 40. If relatively thick or viscous oil spills are encountered, it may be desirable to employ suction tubes which extend in both directions upwardly and downwardly through the upper and lower layers 34 and 35, respectively to draw fluid in through both the top and bottom surfaces of the blanket, as shown in FIG. 5. In this regard, depressions 40 may be formed on both the top and bottom surfaces.

It is therefore to be understood that while a preferred form of oil spill recovery system has been set forth and described, various modifications and changes may be made without departing from the spirit and scope of the present invention as defined by the appended claims and reasonable equivalents thereof.

I claim:

1. In an oil spill recovery system for collecting oil spill contaminants from the surface of a body of water wherein a host vessel is provided with a source of air under pressure, the combination therewith comprising:

a buoyant suction blanket in the form of a flexible, elongated sheet member having opposed upper and lower surface portions and a plurality of conduits extending through said blanket between said upper and lower surface portions, and suction ports at spaced intervals along said conduits for extension behind said vessel between an associated one of said conduits and at least one of said upper and lower surface portions, said blanket having a continuous series of depressions in closely spaced relation to one another formed in at least one of said upper and lower surface portion and said ports communicating with said depressions in said one surface portion;

means for towing said blanket behind said vessel;

air intake and exhaust means cooperating with said conduits to induce the flow of water and any oil spill accumulating on said one surface portion through said ports into said conduits as said blanket is being towed; and means for collecting said water and contaminants from said conduits.

2. In an oil spill recovery system according to claim 1, said conduits extending in a lengthwise direction through said blanket and said air intake and exhaust means being at opposite ends of said blanket.

3. In an oil spill recovery system according to claim 1, said blanket composed of a flexible material which will conform to irregularities on the surface of said body of water.

4. In an oil spill recovery system according to claim 1, including steering means associated with said blanket for controlling the direction of movement of said blanket when deployed behind said host vessel.

5. In an oil spill recovery system according to claim 4, said steering means including steering jets along opposite sides of said blanket in communication with said air pressure source.

6. In an oil spill recovery system according to claim 1, said collecting means including an exhaust pump in communication with a collection chamber at outlets of said conduits.

7. In an oil spill recovery system according to claim 1, including a plurality of blankets and means connecting said blankets in end-to-end relation to one another and in tethered relation to said vessel.

8. In an oil spill recovery system for collecting oil spill contaminants from the surface of a body of water wherein a towing apparatus is provided with a host vessel, a source of air under pressure and air intake and exhaust means, the combination therewith comprising:

a buoyant suction blanket in the form of an elongated flexible sheet member having opposed parallel surface portions and a plurality of conduits extending through said blanket parallel to said surface portions, and suction ports at spaced intervals along said conduits and normal to said conduits for extension through one of said surface portions;

said air intake and exhaust means cooperating with said conduits to induce by venturi effect the flow of water and any oil spill in communication with said ports into said conduits as said blanket is being towed;

a collection chamber for collecting said water and contaminants from said conduits; and steering means associated with said blanket for controlling the direction of movement of said blanket when deployed by said host vessel, said steering means including steering jets in communication with said air pressure source, valve means for each said jet, said steering jets disposed along opposite sides of said blanket, and remote control means on said vessel for independently controlling opening and closing of said valve means for each said jet.

9. In an oil spill recovery system according to claim 8, said conduits extending in a lengthwise direction through said blanket and said air intake and return means being at opposite ends of said blanket.

10. In an oil spill recovery system according to claim 8, said blanket composed of a sheet of flexible plastic material of elongated generally rectangular configuration which will conform to irregularities on the surface of said body of water.

11. In an oil spill recovery system according to claim 8, said blanket having depressions formed in at least one of said surface portions and said suction ports communicating with said depressions in said one surface portion.

12. In an oil spill recovery system according to claim 8, said collection chamber including an exhaust pump in communication with said conduits and a return line to said vessel.

13. In an oil spill recovery system according to claim 8, including a plurality of suction blankets and means connecting said blankets in end-to-end relation to one another and in tethered relation to said vessel.

14. In an oil spill recovery system according to claim 8, said blanket composed of upper and lower layers including said upper and lower surface portions, means joining said layers together with bores formed in spaced parallel relation to one another between said layers to define said conduits in said blanket parallel to said surface portions.

* * * * *